(12) United States Patent
Galimberti et al.

(10) Patent No.: US 10,899,883 B2
(45) Date of Patent: Jan. 26, 2021

(54) (PER)FLUOROPOLYETHER POLYMERS

(71) Applicant: SOLVAY SPECIALTY POLYMERS ITALY S.P.A., Bollate (IT)

(72) Inventors: Marco Galimberti, Bollate (IT); Giovanni Fontana, Milan (IT); Roberto Valsecchi, Verdellino (IT); Vito Tortelli, Milan (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 40 days.

(21) Appl. No.: 16/469,633

(22) PCT Filed: Dec. 12, 2017

(86) PCT No.: PCT/EP2017/082328
§ 371 (c)(1),
(2) Date: Jun. 13, 2019

(87) PCT Pub. No.: WO2018/108864
PCT Pub. Date: Jun. 21, 2018

(65) Prior Publication Data
US 2020/0148820 A1 May 14, 2020

(30) Foreign Application Priority Data
Dec. 14, 2016 (EP) .................................. 16204179

(51) Int. Cl.
*C08G 65/00* (2006.01)
*C08G 65/332* (2006.01)
*C10M 107/38* (2006.01)
*G11B 5/71* (2006.01)
*C10N 40/18* (2006.01)

(52) U.S. Cl.
CPC ....... *C08G 65/3322* (2013.01); *C08G 65/007* (2013.01); *C10M 107/38* (2013.01); *G11B 5/71* (2013.01); *C10M 2213/0606* (2013.01); *C10N 2040/18* (2013.01)

(58) Field of Classification Search
CPC .... C08G 65/00; C08G 65/007; C08G 65/331; C08G 65/323; C10M 107/38; C10M 2213/0606; C10N 2040/18
See application file for complete search history.

(56) References Cited

U.S. PATENT DOCUMENTS

| | | | |
|---|---|---|---|
| 7,321,062 B2 | 1/2008 | Fontana et al. | |
| 2004/0192974 A1 | 9/2004 | Navarrini et al. | |
| 2011/0136713 A1 | 6/2011 | Marchionni et al. | |
| 2014/0235816 A1* | 8/2014 | Arcella | C08G 65/00 528/337 |
| 2014/0309376 A1 | 10/2014 | Galimberti et al. | |
| 2015/0337228 A1* | 11/2015 | Isobe | C08G 65/007 508/582 |
| 2016/0137947 A1 | 5/2016 | Isobe et al. | |
| 2018/0047419 A1* | 2/2018 | Fukumoto | C07C 43/11 |
| 2019/0062496 A1* | 2/2019 | Tonelli | C08G 65/007 |
| 2019/0106538 A1* | 4/2019 | Valsecchi | C08G 65/3351 |

FOREIGN PATENT DOCUMENTS

| | | |
|---|---|---|
| GB | 1226566 A | 3/1971 |
| WO | 2010057691 A2 | 5/2010 |
| WO | 2014195299 A1 | 12/2014 |

OTHER PUBLICATIONS

Marchionni G. et al., "Structure—Property Relationships in Perfluoropolyethers: A Family of Polymeric Oils", Comprehensive Polymer Science and Supplements, 1996, p. 347-388, ed. by Allen G. et al., Elsevier Ltd.
Avataneo M. et al., "Synthesis of alfa-omega-dimethoxyfluoropolyethers: reaction mechanism and kinetics", Journal of Fluorine Chemistry, 2005, vol. 126, p. 633-639, Elsevier B.V.
Galimbert M. et al., "New catalytic alkylation of in situ generated perfluoro-alkyloxy-anions and perfluoro-carbanions", Journal of Fluorine Chemistry, 2005, vol. 126, p. 1578-1586, Elsevier B.V.

* cited by examiner

*Primary Examiner* — Ellen M McAvoy
(74) *Attorney, Agent, or Firm* — Osha Bergman Watanabe & Burton LLP

(57) ABSTRACT

The present invention relates to a novel process for the synthesis of (per)fluoropolyether polymers and to certain novel (per)fluoropolyether polymers. The present invention also relates to the use the (per)fluoropolyether polymers thus obtained, as intermediate compounds for the manufacture of further polymers suitable for use as lubricants, notably for magnetic recording media (MRM).

17 Claims, No Drawings

(PER)FLUOROPOLYETHER POLYMERS

CROSS-REFERENCE TO RELATED PATENT APPLICATIONS

This application is a U.S. national stage entry under 35 U.S.C. § 371 of International Application No. PCT/EP2017/082328 filed Dec. 12, 2017, which claims priority to European patent application No. EP 16204179.2, filed on Dec. 14, 2016. The entire contents of these applications are explicitly incorporated herein by this reference.

TECHNICAL FIELD

The present invention relates to a novel process for the synthesis of (per)fluoropolyether polymers and to certain novel (per)fluoropolyether polymers. The present invention also relates to the use of the (per)fluoropolyether polymers thus obtained, as intermediate compounds for the manufacture of further polymers suitable for use as lubricants, notably for magnetic recording media (MRM).

BACKGROUND ART

Among fluorinated polymers, (per)fluoropolyether polymers (PFPEs) are well-known and of great interest for their chemical and physical properties, which make them particularly interesting as lubricants.

Several synthesis of PFPEs polymers have been disclosed in the art. The first synthesis of unspecified perfluorinated polyether mixtures was reported in 1953, when an oily product was obtained in the course of photoligomerization of hexafluoropropene. Since then, a number of different perfluorinated polyethers have been synthesized and described in literature. (ALLEN, Geoffrey, et al. COMPREHENSIVE POLYMER SCIENCE—Second supplement. Edited by SIR ALLEN, Geoffrey, et al. Elsevier Science & Technology Books, 1996. ISBN 0080427081. p. 347-388.).

For example, the catalytic polymerization of perfluoroepoxides, such as notably hexafluoropropylene oxide (HFPO), firstly disclosed by Du Pont researchers, led to a product commercially available under the trade name Krytox®, which backbone comprises recurring units of formula —[CF(CF$_3$)CF$_2$O]$_y$—. Then, Montedison researchers disclosed the photochemical oxidation of perfluoro-olefins, such as tetrafluoroethylene and hexafluoropropene, which led to a product commercially available under the trade name Fomblin®, which backbone comprises randomly distributed recurring units of formula —[(CF$_2$O)$_m$(CF$_2$CF(R)O)$_n$]— wherein R is —F or —CF$_3$. Another synthesis, which involved the ring opening polymerization of partially fluorinated oxetanes followed by fluorination, was disclosed by Daikin Company and led to a product commercially available under the trade name Demnum®, which backbone comprises recurring units of formula —(CF$_2$CF$_2$CF$_2$O)$_p$—.

The main difference between the (per)fluoropolyether polymers known in the art resides in the fact that Krytox® polymers and Demnum® polymers are homopolymers characterized by an ordered structure, which comprises only one type of recurring unit, i.e. —[CF(CF$_3$)CF$_2$O]$_y$— and —(CF$_2$CF$_2$CF$_2$O)$_p$—, respectively. Differently, Fomblin® polymers are copolymers characterized by the presence of two or more recurring units having a different formula and being randomly distributed (also defined as statistically distributed) along the backbone chain. This random distribution of the recurring units is due to the manufacturing process based on photochemical oxidation of perfluoroolefins. However, the random distribution of the recurring units could led to a backbone chain comprising multiple consecutive recurring units having one carbon atoms (i.e., of formula —CF$_2$O—), which on the one hand increase the flexibility of the polymer backbone but on the other hand constitute a weak point in the polymer backbone, as they are more easily attacked by metals and/or Lewis acids.

Partially fluorinated compounds and methods for their preparation have been disclosed in the art.

For example in US 20040192974 (SOLVAY SOLEXIS S.P.A.), which discloses a process for obtaining hydrofluoroether compounds comprising a (per)fluoroxyalkylene chain containing recurring units that are statistically distributed along the chain.

Also, WO 2010/057691 (SOLVAY SOLEXIS S.P.A.) discloses the synthesis of hydrofluoroalcohols of formula (I):

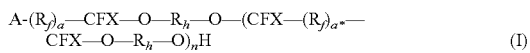

(I)

wherein R$_h$ is a divalent C1-C20 hydrocarbon-based residue,
X is F or a C1-C6-(per)fluoroalkyl,
R$_f$ is a (per)fluoro(poly)oxyalkylene (PFPE) chain or a (per)fluoroalkyl chain. According to the preferred embodiment, R$_f$ is a PFPE chain comprising one or more recurring units of formula —(C$_3$F$_6$O)—, —(CF$_2$O)—, —(CF$_2$CF$_2$O)—, —(CF$_2$CF$_2$CF$_2$O)—, —(CF$_2$CF$_2$CF$_2$CF$_2$O)—, —[CF(CF$_3$)O]—, which are statistically (i.e. randomly) distributed along the chain.

None of the above mentioned documents however discloses or suggests the perfluorination reaction of the hydrofluoro compounds obtained therein.

The synthesis of alfa-omega-dimethoxyfluoropolyethers was disclosed in AVATANEO, Marco, et al. Synthesis of alfa-omega-dimethoxyfluoropolyethers: reaction mechanism and kinetics. *Journal of Fluorine Chemistry*. 2005, vol. 126, p. 633-639. and in GALIMBERTI, Marco, et al. New catalytic alkylation of in situ generated perfluoro-alkyloxyanions and perfluoro-carbanions. *Journal of Fluorine Chemistry*. 2005, vol. 126, p. 1578-1586. However, the synthesis disclosed in these articles started from alkyl fluoroformate and perfluoropolyether diacyl fluoride, the latter being obtained by photopolymerization. In other words, the perfluoropolyether comprises at one chain end the group of formula —C(O)F, but it also comprises recurring units of formula —(CF$_2$CF$_2$O)— and —(CF$_2$O)— that are randomly distributed within the backbone of the polymer.

US 2016137947 (ASAHI GLASS COMPANY LIMITED) discloses fluorinated polyether compounds complying with formula: {X—O—[(CF$_2$CF$_2$O)$_a$—(CF$_2$CF$_2$CF$_2$CF$_2$O)$_b$]}$_m$—Y—{[(OCF$_2$CF$_2$)$_c$—(OCF$_2$CF$_2$CF$_2$CF$_2$)$_d$]—O—Z}$_n$ wherein
m is from 1 to 10;
n is from 0 to 10;
X is a group having a hydroxy group, a carboxy group, an ester group or an aryl group;
Y is an (m+n) valent alkane group, an (m+n) valent alkane group having an etheric oxygen atom inserted between carbon-carbon atoms, an (m+n) valent fluoroalkane group, an (m+n) valent fluoroalkane group having an etheric oxygen atom inserted between carbon-carbon atoms, or a cyclotriphosphazene structure (P$_3$N$_3$); and
Z is a group not having a hydroxy group, a carboxy group, an ester group or an aryl group, and having a haloalkyl group (provided that the halogen atom is a fluorine atom or a chlorine atom) or a haloalkyl group (provided that the halogen atom is a fluorine atom or a chlorine atom) having an etheric oxygen inserted between carbon-carbon atoms. In the moiety —[$(CF_2CF_2O)_a$—$(CF_2CF_2CF_2CF_2O)_b$]— the linking order of "a" number of units ($CF_2CF_2O$) and "b" number of units ($CF_2CF_2CF_2CF_2O$) is not limited, i.e. units ($CF_2CF_2O$) and ($CF_2CF_2CF_2CF_2O$) may be randomly located, alternately arranged or at least one block consisting of a plurality of units ($CF_2CF_2O$) and units ($CF_2CF_2CF_2CF_2O$) may be linked. Structures having the following formula are preferred —$CF_2CF_2O$($CF_2CF_2CF_2CF_2OCF_2CF_2O)_e$—
wherein e is from 1 to 99.

SUMMARY OF INVENTION

The Applicant faced the problem of preparing (per)fluoropolyether polymers having a pre-defined chemical structure, i.e. (per)fluoropolyether polymers characterized by recurring units which distribution in the polymer backbone is non-random but defined a priori.

Surprisingly, the Applicant found a process, which can be conveniently applied on industrial scale, for the synthesis of perfluoropolyether polymers wherein the recurring units are not randomly distributed in the backbone chain.

In a first aspect, the present invention relates to a process [process ($P_{FOR}$)] for the synthesis of at least one polymer [polymer ($PFPE_{FOR}$)] comprising a perfluoropolyether backbone having two chain ends, wherein at least one chain end comprises at least one group selected from linear or branched perfluoroalkyl group comprising from 1 to 6 carbon atoms,
—OC(=O)F and —C(=O)F,
said process comprising the steps of:
(I) contacting at least one perfluoro compound [compound (F)] comprising at least two acyl-fluoride groups with at least one hydrogenated compound [compound (H)] comprising at least two fluoroformate groups, to provide a polymer [polymer (FH)] comprising a partially fluorinated polyether backbone having two chain ends,
wherein said backbone comprises recurring unit(s) derived from said at least one compound (F) alternately arranged with recurring unit(s) derived from said at least one compound (H), and
wherein at least one of said chain ends comprises at least one group selected from —OC(=O)F and —C(=O)F; and
(II) contacting said polymer (FH) obtained in step (I) with a source of fluorine, to provide at least one polymer (PFPE-$_{FOR}$).

Advantageously, the process according to the present invention allows to prepare polymers comprising a perfluoropolyether backbone comprising recurring units which are distributed within the backbone in a pre-determined and well defined way.

The Applicant noted that certain polymers ($PFPE_{FOR}$) are novel, i.e. they have not been disclosed in any prior art document known to the Applicant.

Thus, in a second aspect, the present invention relates to a perfluoropolyether polymer [polymer ($PFPE^*_{FOR}$)] comprising a perfluoropolyether backbone having two chain ends, wherein:
  at least one of said chain end comprises at least one group selected from linear or branched perfluoroalkyl group comprising from 1 to 6 carbon atoms, —OC(=O)F and —C(=O)F, and
  said backbone comprises at least one moiety, more preferably two moieties, complying with the following formulae (Ia) to (If):

—$(C_2F_4O)_a$—;  (Ia)

—$(C_3F_6O)_b$—;  (Ib)

—$(C_4F_8O)_c$—;  (Ic)

—$(C_5F_{10}O)_d$—;  (Id)

—$(C_6F_{12}O)_e$—;  (Ie)

—$(C_xF_{2x}O)_f$—;  (If)

wherein
x is an integer from 7 to 12, preferably from 7 to 10;
each of a, b, c, d, e and f is independently 0 or an integer, wherein the sum of a, b, c, d, e and f is such that the average number molecular weight of the backbone of said polymer ($PFPE_{FOR}$) is from 282 to 70 000, preferably from 600 to 50 000, more preferably from 700 to 10 000, and even more preferably from 800 to 5 000;
with the proviso that:
  when a is different from 0, at least one of b, c, d, e or f is different from 0,
  when b is different from 0, at least one of a, c, d, e or f is different from 0,
  when c is different from 0, at least one of a, b, d, e or f is different from 0;
and with the proviso that when said backbone comprises two moieties complying with formulae (Ia) to (If) as defined above, said two moieties are alternately arranged within the backbone.

Polymer ($PFPE^*_{FOR}$) is advantageously obtained by process ($P_{FOR}$) as defined above.

The Applicant noted that polymer ($PFPE_{FOR}$) as defined above, comprising at least one group of formula —OC(=O)F or —C(=O)F, can be further reacted in order to provide perfluoropolyether polymer [polymer ($PFPE_D$)] comprising a perfluoropolyether backbone as defined above for polymer ($PFPE_{FOR}$) having two chain ends, wherein each chain end comprises at least one neutral group or at least one functional group.

Thus, in a third aspect, the present invention relates to the use of polymer ($PFPE_{FOR}$) as intermediate compound in the synthesis of polymer ($PFPE_D$).

DESCRIPTION OF EMBODIMENTS

For the purpose of the present description and of the following claims:
  the use of parentheses around symbols or numbers identifying the formulae, for example in expressions like "polymer ($PFPE_{FOR}$)", etc., has the mere purpose of better distinguishing the symbol or number from the rest of the text and, hence, said parenthesis can also be omitted;
  the term "(per)fluoropolyether" is intended to indicate polyether polymer(s) comprising a fully fluorinated or partially fluorinated backbone;
  the term "perfluoropolyether" is intended to indicate polyether polymer(s) comprising a fully fluorinated backbone;
  the expression "neutral group" is intended to indicate fluorine atom or a linear or branched perfluoroalkyl chain having from 1 to 10 carbon atoms, such as for example, —$CF_3$, —$C_2F_5$, $C_3F_7$;
  the expression "functional group" is intended to indicate a group different from said neutral group. Suitable examples of said functional group are: —OH, —C(O)

OR wherein R is hydrogen atom or a linear or branched alkyl group having from 1 to 6 carbon atoms, linear or branched alkyl chain having from 1 to 12 carbon atoms wherein the alkyl chain is optionally interrupted by at least one oxygen atom and/or optionally substituted with at least one —OH group, amino, amide, triazine, phosphazene, siloxane.

Preferably, said compound (F) is a compound of formula:

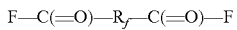
F—C(=O)—$R_f$—C(=O)—F wherein $R_f$ is a divalent, perfluoro linear or branched alkyl chain, wherein said alkyl chain comprises from 1 to 10 carbon atoms and is optionally interrupted by one or more oxygen atoms.

More preferably, said perfluoro alkyl group is linear.

More preferably, said perfluoro alkyl group comprises from 1 to 5 carbon atoms, even more preferably from 1 to 4 carbon atoms.

Preferably, said compound (F) is selected from the group comprising:

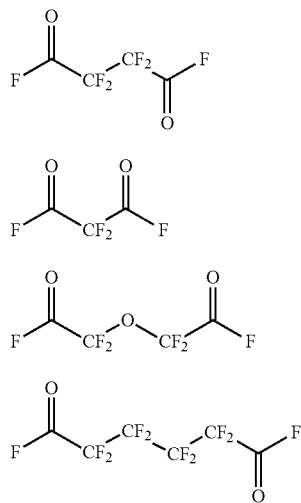

(F-i)

(F-ii)

(F-iii)

(F-iv)

Preferably, said compound (H) is a compound of formula:
F—C(=O)O—$R_H$—OC(=O)—F
wherein $R_H$ is a divalent linear or branched alkyl chain, wherein said alkyl chain comprises from 2 to 10 carbon atoms and is optionally interrupted by one or more oxygen atoms.

More preferably, said alkyl chain is linear.

More preferably, said alkyl chain comprises from 2 to 8 carbon atoms, even more preferably from 2 to 6 carbon atoms.

Preferably, said compound (H) is selected from the group comprising:

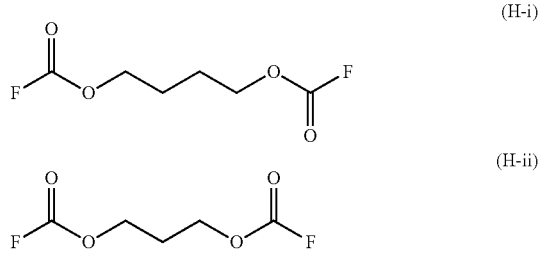

(H-i)

(H-ii)

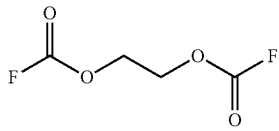

(H-iii)

Preferably, the molar ratio between said compound (H) and said compound (F) is from 0.1 to 10, more preferably from 0.3 to 3 and even more preferably from 0.5 to 2.

According to one embodiment, said step (I) comprises optionally adding, to said compound (F) and to said compound (H), one or more compound [compound (F-mono)] comprising one acyl-fluoride group, and/or one or more compound [compound (H-mono)] comprising one fluoroformate group. Said compound (H-mono) is preferably selected from alkyl fluoroformate, more preferably it is methyl fluoroformate. Said compound (F-mono) is preferably selected from those of formula $R^1$—C(=O)F wherein $R^1$ is a linear or branched perfluoro alkyl group comprising from 1 to 12 carbon atoms, more preferably from 1 to 6 carbon atoms and even more preferably from 1 to 3 carbon atoms.

Preferably, step (I) is performed in the presence of a source of fluoride, more preferably a metal fluoride. Preferred metal fluorides are for example selected in the group comprising, preferably consisting of, CsF, KF, RbF, AgF and combinations thereof.

Said metal fluorides are preferably used as such. However, embodiments wherein the metal fluoride is supported onto charcoal, NaF or $CaF_2$ are also encompassed by the present invention.

Preferably, step (I) is performed in the presence of a solvent, more preferably in the presence of a polar aprotic solvent.

Preferably, said polar aprotic solvent is selected in the group comprising, more preferably consisting of, dimethoxyethane (glyme), bis(2-methoxyethyl) ether (di-glyme), triethylene glycol dimethyl ether (tri-glyme), tetraethylene glycol dimethyl ether (tetraglyme), tetrahydrofuran, acetonitrile, dimethyl sulfoxide, dimethylformamide, ethylene polyoxides dimethylethers. Tetraglyme and acetonitrile being more preferred.

Step (I) can be performed by adding said compound (F) to said compound (H), or viceversa by adding said compound (H) to said compound (F). According to a preferred embodiment, said compound (F) and said compound (H) are added at the same time to the reaction environment.

Preferably, after step (I), the backbone of said polymer (FH) complies with the following formula ($FH_b$):

—[$CF_2$—$R_f$—$CF_2O$—$R_H$—O]$_y$—  ($FH_b$)

wherein
$R_f$ has the same meanings defined above for compound (F),
$R_H$ has the same meanings defined above for compound (H), and
y is an integer such that the average number molecular weight of the backbone of said polymer (FH) is from 210 to 50 000, preferably from 380 to 30 000, more preferably from 450 to 8 000, and even more preferably from 500 to 3 000.

Depending on the molar ratio of compound (F) and of compound (H) used in step (I), polymer(s) (FH) is(are) obtained comprising at their chain ends two groups —C(=O)F, two groups —OC(=O)F or one group —C(=O)F and one group —OC(=O)F.

More in particular, when the molar ratio between compound (F) and compound (H) is higher than 1, i.e. when compound (F) is used in molar excess compared to compound (H), polymer (FH) comprising at its chain end two groups —C(=O)F is preferably obtained.

According to this first variant, polymer (FH) having the following general formula ($FH_{b1}$) is obtained:

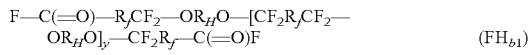   ($FH_{b1}$)

wherein $R_f$, $R_H$ and y are as defined above.

It will be apparent to those skilled in the art that the very same polymer having general formula ($FH_{b1}$) can also be written using a different general formula—while, however, the very same polymer is intended. One alternative is for example the following:

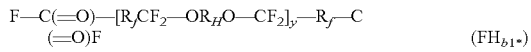   ($FH_{b1*}$)

Preferably, when the molar ratio between compound (F) and compound (H) is lower than 1, i.e. when compound (H) is used in molar excess compared to compound (F), polymer (FH) comprising at its chain end two groups —OC(=O)F is preferably obtained.

According to this second variant, polymer (FH) having the following general formula ($FH_{b2}$) is obtained:

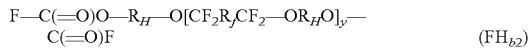   ($FH_{b2}$)

wherein $R_f$, $R_H$ and y are as defined above.

Also, when the molar ratio between compound (F) and compound (H) is about 1, i.e. when a stoichiometric amount of compound (F) and of compound (H) is used, polymer (FH) comprising at one chain end a group —C(=O)F and at the other chain end a group —OC(=O)F is preferably obtained.

According to this third variant, polymer (FH) having the following general formula ($FH_{b3}$) is obtained:

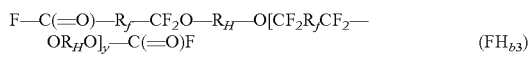   ($FH_{b3}$)

wherein $R_f$, $R_H$ and y are as defined above.

It will be clear to those skilled in the art, that while the reaction conditions of step (I) are controlled, a mixture of polymer ($FH_{b1}$), polymer ($FH_{b2}$) and polymer ($FH_{b3}$) as defined above can be obtained and is encompassed within the present invention. As a consequence, after step (II), mixtures of polymers ($PFPE_{FOR}$) will be obtained as will be described in great detail later.

From the formulae above representing preferred embodiments of polymer (FH), it will be apparent that polymer (FH) comprises a backbone and two chain ends as defined above, wherein said backbone and said chain ends are preferably bonded together via a sigma bond or a linking chain [chain (L)] comprising at least one moiety $R_H$ and/or at least one moiety $R_f$, wherein $R_H$ and $R_f$ are as defined above, optionally at least one oxygen atom and optionally at least one group —$CF_2$—.

Said chain (L) preferably complies with the following formulae:

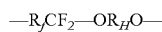

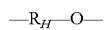

wherein $R_H$ and $R_f$ are as defined above.

Preferably, the source of fluorine in step (II) is a gas containing fluorine atoms. More preferably, said source of fluorine is fluorine gas ($F_2$).

Advantageously, the source of fluorine in step (II) is used in admixture with a diluting gas, preferably selected from inert gas, such as helium and nitrogen.

Advantageously, a halogenated olefin can be added in order to generate fluorine radicals to help the fluorination step. Said halogenated olefin can be selected for example from tetrafluoroethylene (TFE), hexafluoropropylene (HFP), octafluorobutene, perfluoropentene, perfluorohexene, perfluoroheptene, perfluorooctene, perfluorocyclobutene, perfluorocyclopentene, perfluorocyclohexene, chlorotrifluoroethylene (CTFE), dichlorodifluoroethylene, chloropentafluoropropene, perfluorobutadiene, perfluoromethylvinylether, perfluoro-ethylvinylether, perfluoro-propylvinylether; $CF_3OClC=CClF$, trichloroethylene, tetrachloroethylene, dichloroethylene isomers; and fluorodioxoles.

Preferably, said polymer ($PFPE_{FOR}$) comprises a backbone comprising a recurring unit complying with the following formula ($PFPE_{FOR\text{-}b}$):

   ($PFPE_{FOR\text{-}b}$)

wherein $R_f$ has the same meanings defined above for compound (F), $R_F$ is a divalent linear or branched perfluoro alkylene chain comprising from 2 to 10 carbon atoms and optionally interrupted by one or more oxygen atoms and y* is an integer such that the average number molecular weight of the backbone of said polymer ($PFPE_{FOR}$) is from 282 to 70 000, preferably from 600 to 50 000, more preferably from 700 to 10 000, and even more preferably from 800 to 5 000.

Moiety ($R_F$) in formula ($PFPE_{FOR\text{-}b}$) corresponds to moiety ($R_H$) in formula ($FH_b$) after the perfluorination in step (II) of process ($P_{FOR}$).

Accordingly, in formula ($PFPE_{FOR\text{-}b}$) above, moiety —$CF_2$—$R_f$—$CF_2O$-preferably corresponds to recurring units of formula (Ib) to (If) as defined above and moiety —$R_FO$— corresponds to the recurring units of formula (Ia) to (If) as defined above.

Also, when properly considering formula ($PFPE_{FOR\text{-}b}$) above, it will be apparent that moiety —$CF_2$—$R_f$—$CF_2O$— and moiety —$R_FO$— are alternately arranged, such that when moiety —$CF_2$—$R_f$—$CF_2O$— and moiety —$R_FO$- correspond to two different recurring units of formula (Ia) to (If), they are alternately arranged within the backbone.

Preferably, in polymer ($PFPE_{FOR}$), the backbone is linked at its opposite sides to one chain end, via a sigma bond or a linking chain [chain (L)] comprising at least one moiety $R_F$ and/or at least one moiety $R_f$, wherein R F and $R_f$ are as defined above, optionally at least one oxygen atom and optionally at least one group —$CF_2$—.

Said chain (L) preferably complies with the following formulae:

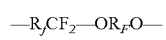

wherein $R_F$ and $R_f$ are as defined above.

Preferred embodiments of polymer (PFPE$_{FOR}$) are those represented in formulae (PFPE$_{FOR-1}$) to (PFPE$_{FOR-6}$) below:

(PFPE$_{FOR-1}$)

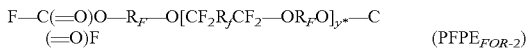
(PFPE$_{FOR-2}$)

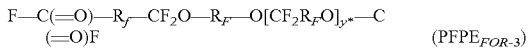
(PFPE$_{FOR-3}$)

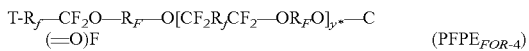
(PFPE$_{FOR-4}$)

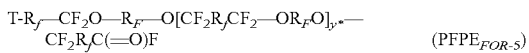
(PFPE$_{FOR-5}$)

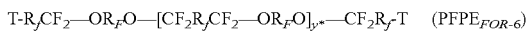
(PFPE$_{FOR-6}$)

wherein
$R_f$ and $R_F$ have the same meanings defined above for polymer (PFPE$_{FOR-b}$),
T is a neutral group selected in the group comprising, preferably consisting of, fluorine atom and linear or branched perfluoroalkyl chain comprising from 1 to 6 carbon atoms, and
y* is as defined above.

Preferably, said chain $R_F$ is a linear perfluoro alkylene chain, more preferably comprising from 2 to 8 carbon atoms, even more preferably from 2 to 6 carbon atoms.

Polymers (PFPE$_{FOR-1}$) to polymer (PFPE$_{FOR-3}$) wherein both chain ends comprise one functional group are also referred to as bi-functional PFPE polymers. Polymer (PFPE$_{FOR-4}$) and polymer (PFPE$_{FOR-5}$) wherein only one chain end comprises one neutral group are also referred to as mono-functional PFPE polymers. Polymer (PFPE$_{FOR-6}$) wherein both chain ends comprise one neutral group T is also referred to as neutral PFPE polymer.

Embodiments of (PFPE$_{FOR}$) complying with formulae (PFPE$_{FOR-1}$) to (PFPE$_{FOR-5}$) are preferred. Embodiments of (PFPE$_{FOR}$) complying with formulae (PFPE$_{FOR-1}$) to (PFPE$_{FOR-3}$) are even more preferred.

Embodiments of polymer (PFPE*$_{FOR}$) comprising two recurring moieties complying with formulae (Ia) to (If) as defined above are preferred.

Preferably, said polymer (PFPE*$_{FOR}$) comprises a backbone comprising two recurring moieties selected from those of formula:

(Ia)

(Ib)

(Ic)

(Id)

(Ie)

wherein each of a, b, c, d and e is as defined above.

Preferably, said recurring moieties (Ia) to (Ie) are linear, i.e. they comply with the following formulae:

(Ia*)

(Ib*)

(Ic*)

(Id*)

(Ie*)

Preferred embodiments of polymer (PFPE*$_{FOR}$) are those represented in formulae (PFPE*$_{FOR-1}$) to (PFPE*$_{FOR-3}$) below:

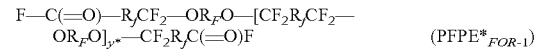
(PFPE*$_{FOR-1}$)

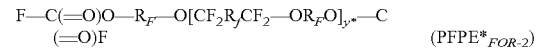
(PFPE*$_{FOR-2}$)

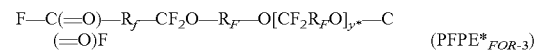
(PFPE*$_{FOR-3}$)

wherein
y* is as defined above, and
$R_f$ and $R_F$ have the same meanings defined above for polymer (PFPE$_{FOR-b}$).

Advantageously, polymers (PFPE$_D$) are obtained via a process starting from at least one polymer (PFPE$_{FOR}$) complying with formulae (PFPE$_{FOR-1}$) to (PFPE$_{FOR-5}$) as defined above.

For example, polymers (PFPE$_D$) having two chain ends, wherein both chain ends comprise one neutral group—also referred to as neutral PFPE polymer [polymer (PFPE$_{D-N}$)]—can be advantageously prepared starting from said polymers (PFPE$_{FOR}$) following synthetic pathways known to the person skilled in the art, such as for example those disclosed in US 2014309376, GB 1226566 and U.S. Pat. No. 7,321,062 (SOLVAY SOLEXIS S.P.A.).

According to a preferred embodiment, starting from said polymers (PFPE FOR) as defined above, polymers (PFPE$_D$) comprising a perfluoropolyether backbone as defined above for polymer (PFPE$_{FOR}$) having two chain ends, wherein at least one chain end (more preferably both chain ends) comprises at least one functional group are prepared.

Advantageously, said polymer (PFPE$_{FOR}$), preferably complying with at least one of formulae (PFPE$_{FOR-1}$) to (PFPE$_{FOR-5}$) or with at least one of formulae (PFPE*$_{FOR-1}$) to (PFPE*$_{FOR-3}$) as defined above, is contacted with at least one compound bearing at least one —OH group, more preferably with at least one compound having general formula R—OH, wherein R is a linear or branched alkyl chain having from 1 to 10 carbon atoms, to provide a polymer [polymer (PFPE$_{D-EST}$)] comprising a perfluoropolyether backbone as defined above for polymer (PFPE$_{FOR}$) having two chain ends, wherein at least one chain end comprises a group of formula —CF$_2$C(=O)OR, wherein R is as defined above.

Thus, in a further aspect, the present invention relates to a polymer [polymer (PFPE$_{D-EST}$)] comprising a perfluoropolyether backbone as defined above for polymer (PFPE$_{FOR}$) having two chain ends, wherein at least one chain end comprises a group of formula —CF$_2$C(=O)OR, wherein R is a linear or branched alkyl chain having from 1 to 10 carbon atoms.

More preferably, both chain ends of said polymer (PFPE$_{D-EST}$) comprise a group of formula —CF$_2$C(=O)OR, wherein R is as defined above.

Preferably, the backbone of said polymer (PFPE$_{D-EST}$) is different from —[(C$_2$F$_4$O)$_a$(C$_4$F$_8$O)$_c$]$_{y^*}$— wherein a, c and y* are as defined above.

Also, said polymer (PFPE$_{D-EST}$) can be used as intermediate for the synthesis of further derivatives. For example, said (PFPE$_{D-EST}$) is contacted with at least one reducing agent, so as to provide a polymer [polymer (PFPE$_{D-OH}$)] comprising a perfluoropolyether backbone as defined above for polymer (PFPE$_{FOR}$) having two chain ends, wherein at least one chain end comprises a group of formula —CF$_2$CH$_2$OH.

Thus, in a further aspect, the present invention relates to a polymer [polymer (PFPE$_{D\text{-}OH}$)] comprising a perfluoropolyether backbone as defined above for polymer (PFPE$_{FOR}$) having two chain ends, wherein at least one chain end comprises a group of formula —CF$_2$CH$_2$OH, with the proviso that the backbone of said polymer (PFPE$_{D\text{-}OH}$) is different from —[(C$_2$F$_4$O)$_a$(C$_4$F$_8$O)$_c$]$_{y^*}$— wherein a, c and y* are as defined above.

More preferably, both chain ends of said polymer (PFPE$_{D\text{-}OH}$) comprise a group of formula —CF$_2$CH$_2$OH.

In a still further aspect, the present invention relates to polymer (PFPE$_{D\text{-}OH}$) comprising a perfluoropolyether backbone as defined above for polymer (PFPE$_{FOR}$) having two chain ends, wherein at least one chain end comprises a group of formula —CF$_2$CH$_2$OH, wherein said polymer (PFPE$_{D\text{-}OH}$) is obtained via a process comprising the steps of: (I$_{OH}$) contacting at least one perfluoro compound [compound (F)] with at least one hydrogenated compound [compound (H)], wherein said compound (F) and said compound (H) are as defined above in step (I) of process (P$_{FOR}$), to provide a polymer [polymer (FH)] as defined above in step (I) of process (P$_{FOR}$);

(II$_{OH}$) contacting said polymer (FH) obtained in step (I$_{OH}$) with a source of fluorine, to provide a polymer [polymer (PFPE$_{FOR}$)] as defined above in step (II) of process (P$_{FOR}$);

(III$_{OH}$) contacting said polymer (PFPE$_{FOR}$) obtained in step (II$_{OH}$) with at least one compound bearing at least one —OH group, preferably with at least one compound having general formula R—OH, wherein R is a linear or branched alkyl chain having from 1 to 10 carbon atoms, to provide a polymer [polymer (PFPE$_{D\text{-}EST}$)] comprising a perfluoropolyether backbone as defined above for polymer (PFPE$_{FOR}$) having two chain ends, wherein at least one chain end comprises a group of formula —CF$_2$C(=O)OR, wherein R is as defined above;

(IV$_{OH}$) contacting said (PFPE$_{D\text{-}EST}$) obtained in step (III$_{OH}$) with at least one reducing agent, to provide said polymer [polymer (PFPE$_{D\text{-}OH}$)].

Also said polymer (PFPE$_{D\text{-}OH}$) is useful as intermediate for the synthesis of further PFPE polymers comprising a perfluoropolyether backbone as defined above for polymer (PFPE$_{FOR}$).

Among the others, the Applicant noted that said polymer (PFPE$_{D\text{-}OH}$) can be advantageously used for the synthesis of polymer [polymer (PFPE$_{D\text{-}OH\text{-}X}$)] comprising a perfluoropolyether backbone as defined above for polymer (PFPE$_{FOR}$) having two chain ends, wherein at least one chain end comprises a group of formula —CF$_2$CH$_2$O—R$^1$, wherein R$^1$ is a linear or branched alkyl chain comprising from 1 to 16 carbon atoms and being substituted with at least 2, more preferably from 2 to 8, groups —OH.

Thus, in a sixth aspect, the present invention relates to a polymer [polymer (PFPE$_{D\text{-}OH\text{-}X}$)] comprising a perfluoropolyether backbone as defined above for polymer (PFPE$_{FOR}$) having two chain ends, wherein at least one chain end comprises a group of formula —CF$_2$CH$_2$O—R$^1$, wherein R$^1$ is a linear or branched alkyl chain comprising from 1 to 16 carbon atoms and substituted with at least 2, more preferably from 2 to 8, groups —OH.

According to a preferred embodiment, both chain ends in said polymer (PFPE$_{D\text{-}OH\text{-}X}$) comprise a group of formula —CF$_2$CH$_2$O—R$^1$, wherein R$^1$ is as defined above.

According to a more preferred embodiment, said at least one chain end bears one group complying with the following formula, and even more preferably both chain ends comprise one group complying with the following formulae:

—CF$_2$CH$_2$O—CH$_2$CH(OH)CH$_2$OH  (PFPE$_{D\text{-}OH\text{-}X1}$)

—CF$_2$CH$_2$O—CH$_2$CH(OH)CH$_2$OCH$_2$CH(OH)CH$_2$OH  (PFPE$_{D\text{-}OH\text{-}X2}$)

The Applicant also noted that at least two of polymers (PFPE$_{D\text{-}OH}$) and/or of polymers (PFPE$_{D\text{-}OH\text{-}X}$) as defined above can be reacted together, typically via a diepoxy coupling agent, to give the so called "multi dentate" PFPE polymer [polymer (PFPE$_{D\text{-}OH\text{-}MD}$)].

Preferably, said polymer (PFPE$_{D\text{-}OH\text{-}MD}$) complies with the following formula C$_e$—B-A-B—C$_e$
wherein:
each C$_e$ is a group of formula —CF$_2$CH$_2$O—R$^1$, wherein R$^1$ is hydrogen atom, a linear or branched alkyl chain comprising from 1 to 16 carbon atoms and substituted with at least 2, more preferably from 2 to 8, groups —OH;
each B is a group comprising at least one moiety, preferably two moieties, of formulae (Ia) to (If) as defined above; and
A is a divalent alkyl chain comprising from 3 to 20 carbon atoms, said alkyl chain being substituted with at least one, preferably from 1 to 10, —OH group(s) and being optionally substituted with at least one fluorine atom.

The Applicant also noted that said polymer (PFPE$_{D\text{-}OH}$) and said polymer (PFPE$_{D\text{-}OH\text{-}X}$) can be also reacted with at least one compound bearing a cyclophosphazene ring, for example following the procedure disclosed in WO 2014/195299 (SOLVAY SPECIALTY POLYMERS ITALY S.P.A.), to provide a polymer [polymer (PFPE$_{D\text{-}OH\text{-}PN}$)] comprising a cyclophosphazene central core bearing at least one substituent selected from said polymer (PFPE$_{D\text{-}OH}$) and said polymer (PFPE$_{D\text{-}OH\text{-}X}$).

The Applicant noted that the PFPE polymers disclosed above comprising at least one hydroxy group can be advantageously used as lubricants, in particular for magnetic recording media (MRM).

Thus, in a further aspect, the present invention relates to the use of at least one of polymer (PFPE$_{D\text{-}OH}$), polymer (PFPE$_{D\text{-}OH\text{-}X}$), polymer (PFPE$_{D\text{-}OH\text{-}MD}$) and/or polymer (PFPE$_{D\text{-}OH\text{-}PN}$) as defined above, as lubricant for magnetic recording media (MRM).

Indeed, polymer (PFPE$_{D\text{-}OH}$), polymer (PFPE$_{D\text{-}OH\text{-}X}$), polymer (PFPE$_{D\text{-}OH\text{-}MD}$) and/or polymer (PFPE$_{D\text{-}OH\text{-}PN}$) are prepared starting from polymer (PFPE$_{FOR}$), which is in turn synthesized following process (P$_{FOR}$) according to the present invention without recurring moieties comprising 1 carbon atoms, i.e. recurring moieties of formula —(CF$_2$O)—, which are known to make the polymer backbone more prone and fragile to the attack of metal and Lewis acids than moieties comprising two or more carbon atoms. Also, this weakness is particularly increased when polymers are obtained comprising two or even more recurring moieties having one carbon atom in a row, as could happen when using traditional synthesis that provides for polymers having randomly distributed recurring units.

Even more importantly, PFPE polymers free from recurring moieties comprising 1 carbon atom are able to withstand high temperatures. This property is of particular importance in the development of lubricants for use in coating magnetic recording media using the heat-assisted magnetic recording (HAMR) technology. Heat-assisted magnetic recording is a magnetic storage technology for hard drives in which a laser is used to heat the part of the disk that is being written to, such that the heat changes the magnetic properties of the disk for a short time, reducing or removing the super-paramagnetic effect while writing takes place. The effect of HAMR is to allow writing on a much smaller scale than before, greatly increasing the amount of data that can be held on a standard disk platter.

Magnetic Recording Media (MRM) typically comprise multiple layers, including a non-magnetic substrate having sequentially deposited on each side thereof an underlayer, at least one magnetic layer and a protective overcoat, preferably a carbon overcoat.

In a still further aspect, the present invention relates to a method for lubricating a magnetic recording media (MRM), said method comprising providing a magnetic recording media (MRM) comprising at least one magnetic layer, optionally covered by at least one carbon overcoat, and applying at least at least one of polymer ($PFPE_{D-OH}$), polymer ($PFPE_{D-OH-X}$), polymer ($PFPE_{D-OH-MD}$) and/or polymer ($PFPE_{D-OH-PN}$) as defined above, onto said magnetic layer or onto said carbon overcoat.

The step of applying a polymer according to the present invention to the MRM can be performed by any conventional method known in the art.

For example, at least one of polymer ($PFPE_{D-OH}$), polymer ($PFPE_{D-OH-X}$), polymer ($PFPE_{D-OH-MD}$) and/or polymer ($PFPE_{D-OH-PN}$) as defined above can be directly applied on the magnetic layer, or on the protective overcoat if present, of the disk of the MRM.

Alternatively, at least one of polymer ($PFPE_{D-OH}$), polymer ($PFPE_{D-OH-X}$), polymer ($PFPE_{D-OH-MD}$) and/or polymer ($PFPE_{D-OH-PN}$) as defined above can be first dissolved in a suitable solvent, such as hydrofluoroethers (HFEs) for example Novec™ HFEs (commercially available from 3M™), hydrofluorocarbons (HFCs) for example Vertrel® HFCs (commercially available from DuPont™), perfluorinated hydrocarbons, chlorofluorocarbons, hydrochlorofluoro-carbons and combinations thereof, thus obtaining a solution [solution (S)], then the disk is submerged in said solution (S) and slowly withdrawn therefrom.

A conventional lifter-type dipper may be used to submerge the disk of the recording medium in said solution (S). Optionally, the coated disk thus obtained is subjected to further treatments, such as for example exposure to UV radiation. The skilled person can optimize the duration of submergence and the speed of withdrawal to achieve a desired coating thickness.

Preferably, the coating comprising at least one of polymer ($PFPE_{D-OH}$), polymer ($PFPE_{D-OH-X}$), polymer ($PFPE_{D-OH-MD}$) and/or polymer ($PFPE_{D-OH-PN}$) as defined above has a thickness from about 2 to about 30 angstroms (Å), more preferably from 2 to 15 Å.

Should the disclosure of any patents, patent applications, and publications which are incorporated herein by reference conflict with the description of the present application to the extent that it may render a term unclear, the present description shall take precedence.

The invention will be herein after illustrated in greater detail by means of the Examples contained in the following Experimental Section; the Examples are merely illustrative and are by no means to be interpreted as limiting the scope of the invention.

Experimental Section

Methods

The average number molecular weight (Mn) was determined by NMR analysis ($^{19}F$-NMR and $^{1}H$-NMR).

Example 1

Step (a): polycondensation reaction for the synthesis of polymer (FH) having formula $FC(=O)O—R_H—O[CF_2R_fCF_2—OR_HO]_y—C(=O)F$ wherein
$R_H$ is —$(CH_2)_4$—,
$R_f$ is —$(CF_2)_2$— and
y is such that the average number molecular weight was 2200 g/mol.

In a Parr autoclave (100 ml) equipped with a mechanical stirrer and a pressure transducer, dry CsF in powder (obtained from Aldrich Co., title 99.9%; 5.09 g, 33.51 mmol), the fluoroformate $F(O=)C—O(CH_2)_4O—C(=O)F$ (12.20 g, 67.01 mmol) and the tetraethylene glycol dimethyl ether (21.0 g) were charged in a dry-box under nitrogen atmosphere.

After removing the incondensable gases by vacuum at $10^{-5}$ mbar at −196° C., the tetrafluorosuccinoyl fluoride $F(O=)C—CF_2CF_2—C(=O)F$ (13.0 g, 67.01 mmol) was condensed in the autoclave at liquid nitrogen temperature. The reaction mixture was heated at 120° C. by a heating mantle and kept under mechanical stirring at this temperature for 30 hours. The pressure increase in the time, due to the $CO_2$ formation during the alkylation reaction, was monitored showing that the reaction gives high yields in the desired product also in a short times.

After the reaction was finished, the autoclave was cooled down to room temperature and the gaseous products ($CO_2$, HF) were eliminated and bubbled into a solution of NaOH at 5% (100 cc). The fluorinated phase inside the autoclave was recovered and the reaction mixture filtered under pressure over a PTFE filter (0.45 mm) to remove the CsF catalyst.

From the obtained solution the solvent and the unreacted fluoroformate and tetrafluorosuccinoyl fluoride products were eliminated by fractional distillation to give 14.0 g of polymer (FH), that was characterized by $^{1}H$-NMR and $^{19}F$-NMR analyses.

Step (b): perfluorination reaction for the synthesis of polymer having formula $F(O=)CO—R_F—O[CF_2R_fCF_2—OR_FO]_{y*}—C(=O)F$ wherein
$R_F$ is —$(CF_2)_4$—,
$R_f$ is —$(CF_2)_2$— and
y* is such that the average number molecular weight is about 3300 g/mol and synthesis of the corresponding di-ester PFPE polymer.

In a 250 ml stainless steel reactor equipped with a mechanical stirrer, two inlet pipes and a condenser kept at −30° C. on the off-gases line, about 100 ml of 1,2,3,4-tetrachloro-hexafluorobutane (A316) were loaded and kept at 35° C. by an external cooling/heating system. Elemental fluorine (3.2 Nl/h) diluted in He (13.0 Nl/h) was fed to the reactor by the first inlet pipe for 30 minutes, then the polymer obtained in step (a) above (dissolved in A316 to reach the total volume of 50 ml) was fed by the second inlet pipe at 14.3 ml/h flow for 3.5 hours. After this, the reactor was cooled down to 0° C. and 0.3 Nl/h of hexafluoropropene diluted in 1.5 Nl/h of helium were fed by the second inlet pipe for 1 hour to convert the residual hydrogen atoms.

After purging the reactor with helium, 20 ml of ethanol were introduced to convert all the fluoroformate terminal groups to the corresponding ethyl ester. The raw mixture was then treated with sodium fluoride to block HF, filtered and removal of the solvent, of the by-products and of the excess of ethanol was performed by fractional distillation.

19.7 g of the desired perfluorinated PFPE polymer as ethyl ester (number average MW=3300 g/mol) were obtained.

Example 2

Step (a): polycondensation reaction for the synthesis of polymer (FH) having formula F(O=)CO—$R_H$—O[$CF_2R_fCF_2$—O$R_H$O]$_y$—C(=O)F
wherein
$R_H$ is —$(CH_2)_4$—,
$R_f$ is —$(CF_2)_2$— and
y is such that the average number molecular weight is 1400 g/mol.

In a Parr autoclave (100 ml) equipped with a mechanical stirrer and a pressure transducer, dry CsF in powder (obtained from Aldrich Co., title 99.9%; 5.09 g, 33.51 mmol), fluoroformate F(O)C—O($CH_2$)$_4$O—C(O)F (13.42 g, 73.71 mmol) and anhydrous tetraethylene glycol dimethyl ether (21.0 g) were charged in a dry-box under nitrogen atmosphere. After removing the incondensable gases by vacuum at $10^{-5}$ mbar at −196° C., tetrafluorosuccinoyl fluoride F(O=)C—$CF_2CF_2$—C(=O)F (13.0 g, 67.01 mmol) was condensed in the autoclave at liquid nitrogen temperature. The reaction mixture was heated at 120° C. by a heating mantle and kept under mechanical stirring at this temperature for 8 hours while the pressure increase, due to the $CO_2$ formation was observed.

After the reaction was finished, the autoclave was cooled down to room temperature and the gaseous products ($CO_2$, HF) were eliminated and bubbled into a solution of NaOH at 5% (100 cc). The fluorinated phase inside the autoclave was recovered and the reaction mixture filtered under pressure over a PTFE filter (0.45 mm) to remove the CsF catalyst.

From the obtained solution, the solvent and the unreacted fluoroformate and tetrafluorosuccinoyl fluoride were eliminated by fractional distillation to give 13.66 g of the final polymer (FH) having number average MW=1400, that was characterized by $^1$H-NMR and $^{19}$F-NMR analyses.

Step (b): perfluorination reaction for the synthesis of polymer having formula F(O=)CO—$R_F$—O[$CF_2R_fCF_2$—O$R_FO$]$_{y^*}$—C(=O)F
wherein
$R_F$ is —$(CF_2)_4$—,
$R_f$ is —$(CF_2)_2$— and
y* is such that the average number molecular weight is about 2100 g/mol and synthesis of the corresponding di-ester PFPE polymer.

The perfluorination reaction was performed following the procedure described above for step (b) of Example 1, with the only difference that the polymer obtained in step (a) of Example 2 was fed at 14.6 ml/h flow for 3.4 hours.

At the end of the reaction, 18.8 g of the desired perfluorinated PFPE polymer as ethyl ester (number average MW=2100 g/mol) were obtained.

Example 3

Step (a): polycondensation reaction for the synthesis of polymer (FH) having formula F(O=)CO—$R_H$—O[$CF_2R_fCF_2$—O$R_H$O]$_y$—C(=O)F
wherein
$R_H$ is —$(CH_2)_3$—,
$R_f$ is —$(CF_2)_2$— and
y is such that the average number molecular weight is 1100 g/mol.

In a Parr autoclave (100 ml) equipped with a mechanical stirrer and a pressure transducer, dry CsF in powder (obtained from Aldrich Co., title 99.9%; 6.26 g, 41.21 mmol), fluoroformate F(O)C—O($CH_2$)$_3$O—C(O)F (15.25 g, 90.72 mmol) and anhydrous tetraethylene glycol dimethyl ether (25.0 g) were charged in a dry-box under nitrogen atmosphere. After removing the incondensable gases by vacuum at $10^{-5}$ mbar at −196° C., tetrafluorosuccinoyl fluoride F(O=)C—$CF_2CF_2$—C(=O)F (16.0 g, 82.47 mmol) was condensed in the autoclave at liquid nitrogen temperature.

The reaction was then conducted following the same procedure described above in Example 1.

From the obtained solution, the solvent and the unreacted fluoroformate and tetrafluorosuccinoyl fluoride were eliminated by fractional distillation to give 14.42 g of the final polymer (FH) having number average MW=1100, that was characterized by $^1$H-NMR and $^{19}$F-NMR analyses.

Step (b): perfluorination reaction for the synthesis of polymer having formula F(O=)CO—$R_F$—O[$CF_2R_fCF_2$—O$R_FO$]$_{y^*}$—C(=O)F
wherein
$R_F$ is —$(CF_2)_3$—,
$R_f$ is —$(CF_2)_2$— and
y* is such that the average number molecular weight is about 1500 g/mol and synthesis of the corresponding di-ester PFPE polymer.

The perfluorination reaction was performed following the procedure described above for step (b) of Example 1, with the only difference that the polymer obtained in step (a) of Example 3 was fed at 17.3 ml/h flow for 2.9 hours.

At the end of the reaction, 19.1 g of the desired perfluorinated PFPE polymer as ethyl ester (number average MW=1500 g/mol) were obtained.

Example 4

Step (a): polycondensation reaction for the synthesis of polymer (FH) having formula F(O=)CO—$R_H$—O[$CF_2R_fCF_2$—O$R_H$O]$_y$—C(=O)F
wherein
$R_H$ is —$(CH_2)_3$—,
$R_f$ is —$(CF_2)_2$— and
y is such that the average number molecular weight is 1800 g/mol.

Step (a) was performed following the procedure described above in step (a) of Example 3, but heating at 120° C. for 50 hours.

From the obtained solution, the solvent and the unreacted fluoroformate and tetrafluorosuccinoyl fluoride were eliminated by fractional distillation to give 15.80 g of the final polymer (FH) having number average MW=1800, that was characterized by $^1$H-NMR and $^{19}$F-NMR analyses.

Step (b): perfluorination reaction for the synthesis of polymer having formula F(O=)CO—$R_F$—O[$CF_2R_fCF_2$—O$R_FO$]$_{y^*}$—C(=O)F
wherein
$R_F$ is —$(CF_2)_3$—,
$R_f$ is —$(CF_2)_2$— and
y* is such that the average number molecular weight is about 2500 g/mol and synthesis of the corresponding di-ester PFPE polymer.

The perfluorination reaction was performed following the procedure described above for step (b) of Example 1, with the only difference that the polymer obtained in step (a) of Example 4 was fed at 15.8 ml/h flow for 3.2 hours.

At the end of the reaction, 21.1 g of the desired perfluorinated PFPE polymer as ethyl ester (number average MW=2500 g/mol) were obtained.

Example 5

Step (a): polycondensation reaction for the synthesis of polymer (FH) having formula F(O=)CO—$R_H$—O[$CF_2R_fCF_2$—O$R_H$O]$_y$—C(=O)F wherein
$R_H$ is —$(CH_2)_3$—,
$R_f$ is —$(CF_2)_2$— and
y is such that the average number molecular weight is 1900 g/mol.

Step (a) was performed following the procedure described above in step (a) of Example 3, but feeding 13.86 g (82.47 mmol) of fluoroformate F(O)C—O(CH$_2$)$_3$O—C(O)F.

From the obtained solution, the solvent and the unreacted fluoroformate and tetrafluorosuccinoyl fluoride were eliminated by fractional distillation to give 15.24 g of the final polymer (FH) having number average MW=1900, that was characterized by $^1$H-NMR and $^{19}$F-NMR analyses.

Step (b): perfluorination reaction for the synthesis of polymer having formula F(O=)CO—$R_F$—O[CF$_2$R$_f$CF$_2$—OR$_F$O]$_{y^*}$—C(=O)F
wherein
$R_F$ is —$(CF_2)_3$—,
$R_f$ is —$(CF_2)_2$— and
y* is such that the average number molecular weight is 2600 g/mol and synthesis of the corresponding di-ester PFPE polymer.

The perfluorination reaction was performed following the procedure described above for step (b) of Example 1, with the only difference that the polymer obtained in step (a) of Example 5 was fed at 16.4 ml/h flow for 3.0 hours.

At the end of the reaction, 19.5 g of the desired perfluorinated PFPE polymer as ethyl ester (number average MW=2600 g/mol) were obtained.

Example 6

Step (a): polycondensation reaction for the synthesis of polymer (FH) having formula F(O=)CO—$R_H$—O[CF$_2$R$_f$CF$_2$—OR$_H$O]$_y$—C(=O)F
wherein
$R_H$ is —$(CH_2)_3$—,
$R_f$ is —$(CF_2)_2$— and
y is such that the average number molecular weight is 1900 g/mol.

Step (a) was performed following the procedure described above in step (a) of Example 3, but feeding 13.86 g (82.47 mmol) of fluoroformate F(O)C—O(CH$_2$)$_3$O—C(O)F and heating at 120° C. for 48 hours.

From the obtained solution, the solvent and the unreacted fluoroformate and tetrafluorosuccinoyl fluoride were eliminated by fractional distillation to give 18.83 g of the final polymer (FH) having number average MW=2000, that was characterized by $^1$H-NMR and $^{19}$F-NMR analyses.

Step (b): perfluorination reaction for the synthesis of polymer having formula F(O=)CO—$R_F$—O[CF$_2$R$_f$CF$_2$—OR$_F$O]$_{y^*}$—C(=O)F
wherein
$R_F$ is —$(CF_2)_3$—,
$R_f$ is —$(CF_2)_2$— and
y* is such that the average number molecular weight is 2800 g/mol.

The perfluorination reaction was performed following the procedure described above for step (b) of Example 1, with the only difference that the polymer obtained in step (a) of Example 6 was fed at 13.3 ml/h flow for 3.8 hours.

At the end of the reaction, 24.4 g of the desired perfluorinated PFPE polymer as ethyl ester (number average MW=2800 g/mol) were obtained.

Example 7

Step (a): polycondensation reaction for the synthesis of polymer (FH) having formula F(O=)CO—$R_H$—O[CF$_2$R$_f$CF$_2$—OR$_H$O]$_y$—C(=O)F
wherein
$R_H$ is —$(CH_2)_3$—,
$R_f$ is —$(CF_2)_4$— and
y is such that the average number molecular weight is 1200 g/mol.

In a Parr autoclave (100 ml) equipped with a mechanical stirrer and a pressure transducer, dry CsF in powder (Aldrich Co title 99.9%; 5.17 g, 34.03 mmol), the fluoroformate F(O=)C—O(CH$_2$)$_3$O—C(=O)F (11.43 g, 68.00 mmol), the octafluoroadipoyl fluoride F(O=)C—(CF$_2$)$_4$—C(=O)F (2) (20.0 g, 68.00 mmol) and anhydrous acetonitrile (30.0 g) were charged in a dry-box under nitrogen atmosphere.

The reaction mixture was heated at 120° C. by a heating mantle and kept under mechanical stirring at this temperature for 24 hours while the pressure increase, due to the CO$_2$ formation was observed. After the reaction was finished, the autoclave was cooled down to room temperature and the gaseous products (CO$_2$, HF) were eliminated and bubbled into a solution of NaOH at 5% (100 cc).

The fluorinated phase inside the autoclave was recovered and the reaction mixture filtered under pressure over a PTFE filter (0.45 mm) to remove the CsF catalyst.

From the obtained solution the solvent acetonitrile and the unreacted fluoroformate and octafluoroadipoyl fluoride were eliminated by fractional distillation to give 16.89 g of the final fluoropolyether polymer (FH) having number average MW=1200 that was characterized by $^1$H-NMR and $^{19}$F-NMR analyses.

Step (b): perfluorination reaction for the synthesis of polymer having formula F(O=)CO—$R_F$—O[CF$_2$R$_f$CF$_2$—OR$_F$O]$_{y^*}$—C(=O)F
wherein
$R_F$ is —$(CF_2)_3$—,
$R_f$ is —$(CF_2)_4$— and
y* is such that the average number molecular weight is 1500 g/mol and synthesis of the corresponding di-ester PFPE polymer.

The perfluorination reaction was performed following the procedure described above for step (b) of Example 1, with the only difference that the polymer obtained in step (a) of Example 7 was fed at 20.3 ml/h flow for 2.5 hours.

At the end of the reaction, 20.9 g of the desired perfluorinated PFPE polymer as ethyl ester (number average MW=1500 g/mol) were obtained.

Example 8

Step (a): polycondensation reaction for the synthesis of polymer (FH) having formula F(O=)CO—$R_H$—O[CF$_2$R$_f$CF$_2$—OR$_H$O]$_y$—C(=O)F
wherein
$R_H$ is —$(CH_2)_4$—,
$R_f$ is —$(CF_2)_4$— and
y is such that the average number molecular weight is 1100 g/mol.

In a Parr autoclave (100 ml) equipped with a mechanical stirrer and a pressure transducer, dry CsF in powder (Aldrich Co title 99.9%; 3.87 g, 25.48 mmol), the fluoroformate F(O=)C—O(CH$_2$)$_4$O—C(=O)F (10.21 g, 56.10 mmol), the octafluoroadipoyl fluoride F(O=)C—(CF$_2$)$_4$—C(=O)F (15.0 g, 51.00 mmol) and anhydrous acetonitrile (25.0 g) were charged in a dry-box under nitrogen atmosphere.

The reaction mixture was heated at 120° C. by a heating mantle and kept under mechanical stirring at this temperature for 45 hours while the pressure increase, due to the CO$_2$ formation was observed. After the reaction was finished, the autoclave was cooled down to room temperature and the gaseous products (CO$_2$, HF) were eliminated and bubbled into a solution of NaOH at 5% (100 cc). The fluorinated phase inside the autoclave was recovered and the reaction mixture filtered under pressure over a PTFE filter (0.45 mm) to remove the CsF catalyst.

From the obtained solution the solvent acetonitrile and the unreacted fluoroformate and octafluoroadipoyl fluoride were eliminated by fractional distillation to give 15.20 g of the final fluoropolyether polymer (FH) with number average MW=1100 that was characterized by $^1$H-NMR and $^{19}$F-NMR analyses.

Step (b): perfluorination reaction for the synthesis of polymer (PFPE$_{FOR-b3}$) having formula F(O=)CO—R$_F$—O[CF$_2$R$_f$CF$_2$—OR$_F$O]$_{y^*}$—C(=O)F
wherein
R$_F$ is —(CF$_2$)$_4$—,
R$_f$ is —(CF$_2$)$_4$— and
y* is such that the average number molecular weight is 1500 g/mol and synthesis of the corresponding di-ester PFPE polymer.

The perfluorination reaction was performed following the procedure described above for step (b) of Example 1, with the only difference that the polymer obtained in step (a) of Example 8 was fed at 17.8 ml/h flow for 2.8 hours.

At the end of the reaction, 19.0 g of the desired perfluorinated PFPE polymer as ethyl ester (number average MW=1500 g/mol) were obtained.

The invention claimed is:

1. A process (P$_{FOR}$) for the synthesis of at least one polymer (PFPE$_{FOR}$), said polymer (PFPE$_{FOR}$) comprising a perfluoropolyether backbone having two chain ends, wherein at least one chain end comprises at least one group selected from linear or branched perfluoroalkyl group comprising from 1 to 6 carbon atoms, —OC(=O)F and —C(=O)F,
said process (P$_{FOR}$) comprising:
(I) contacting at least one compound (F), wherein compound (F) is a perfluoro compound comprising at least two acyl-fluoride groups with at least one compound (H), wherein compound (H) is a hydrogenated compound comprising at least two fluoroformate groups, to provide a polymer (FH) comprising a partially fluorinated polyether backbone having two chain ends,
wherein said backbone comprises recurring unit(s) derived from said at least one compound (F) alternately arranged with recurring unit(s) derived from said at least one compound (H), and
wherein at least one of said chain ends comprises at least one group selected from —OC(=O)F and —C(=O)F; and
(II) contacting said polymer (FH) obtained in step (I) with a source of fluorine, to provide at least one polymer (PFPE$_{FOR}$).

2. The process according to claim 1, wherein:
said compound (F) is a compound of formula:

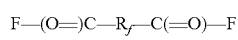

wherein R$_f$ is a divalent, perfluoro linear or branched alkyl chain, wherein said alkyl chain comprises from 1 to 10 carbon atoms and is optionally interrupted by one or more oxygen atoms; and/or
said compound (H) is a compound of formula:

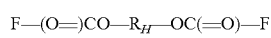

wherein R$_H$ is a divalent linear or branched alkyl chain, wherein said alkyl chain comprises from 2 to 10 carbon atoms and is optionally interrupted by one or more oxygen atoms.

3. The process according to claim 1, wherein, in polymer (PFPE$_{FOR}$), said backbone is linked at its opposite sides to one chain end via a sigma bond or a linking chain (L) comprising at least one moiety R$_f$ and/or at least one moiety R$_F$, wherein
said moiety R$_f$ is a divalent, perfluoro linear or branched alkyl chain, wherein said alkyl chain comprises from 1 to 10 carbon atoms and is optionally interrupted by one or more oxygen atoms, and
said moiety R$_F$ is a divalent linear or branched perfluoro alkylene chain comprising from 2 to 10 carbon atoms and optionally interrupted by one or more oxygen atoms.

4. The process according to claim 1, wherein, in polymer (PFPE$_{FOR}$), said backbone comprises a recurring unit complying with formula (PFPE$_{FOR-b}$):

wherein
R$_f$ is a divalent, perfluoro linear or branched alkyl chain, wherein said alkyl chain comprises from 1 to 10 carbon atoms and is optionally interrupted by one or more oxygen atoms,
R$_F$ is a divalent linear or branched perfluoro alkylene chain comprising from 2 to 10 carbon atoms and optionally interrupted by one or more oxygen atoms, and
y* is an integer selected such that the average number molecular weight of the backbone of polymer (PFPE$_{FOR}$) as determined by NMR analysis is from 282 to 70-000.

5. The process according to claim 1, wherein polymer (PFPE$_{FOR}$) complies with one of formulae (PFPE$_{FOR-1}$) to (PFPE$_{FOR-6}$):

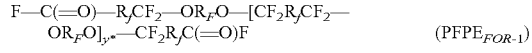

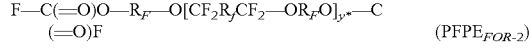

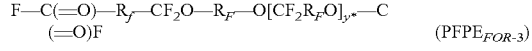

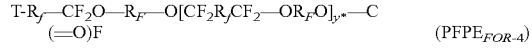

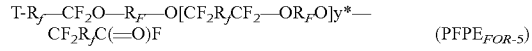

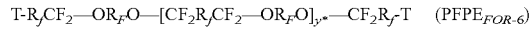

wherein
R$_f$ is a divalent, perfluoro linear or branched alkyl chain, wherein said alkyl chain comprises from 1 to 10 carbon atoms and is optionally interrupted by one or more oxygen atoms,
R$_F$ is a divalent linear or branched perfluoro alkylene chain comprising from 2 to 10 carbon atoms and optionally interrupted by one or more oxygen atoms,
y* is an integer selected such that the average number molecular weight of the backbone of the polymer as determined by NMR analysis is from 282 to 70000, and
T is a neutral group selected in the group comprising fluorine atom and linear or branched perfluoroalkyl chain comprising from 1 to 6 carbon atoms.

6. The process according to claim 1, wherein step (I) comprises adding at least one compound (F-mono), wherein compound (F-mono) is a compound comprising one acylfluoride group, and/or at least one compound (H-mono), wherein compound (H-mono) is a compound comprising one fluoroformate group.

7. A perfluoropolyether polymer (PFPE*$_{FOR}$) comprising a perfluoropolyether backbone having two chain ends, wherein:
- at least one of said chain end comprises at least one group selected from linear or branched perfluoroalkyl group comprising from 1 to 6 carbon atoms, —OC(=O)F and —C(=O)F, and
- said backbone comprises at least one moiety selected from moieties of formulae (Ia) to (If):

$$—(C_2F_4O)_a—; \quad (Ia)$$

$$—(C_3F_6O)_b—; \quad (Ib)$$

$$—(C_4F_8O)_c—; \quad (Ic)$$

$$—(C_5F_{10}O)_d—; \quad (Id)$$

$$—(C_6F_{12}O)_e—; \quad (Ie)$$

$$—(C_xF_{2x}O)_f—; \quad (If)$$

wherein
x is an integer from 7 to 12;
each of a, b, c, d, e and f is independently 0 or an integer, wherein the sum of a, b, c, d, e and f is such that the average number molecular weight of the backbone of the polymer as determined by NMR analysis is from 282 to 70-000;
with the proviso that:
- when a is different from 0, at least one of b, c, d, e or f is different from 0,
- when b is different from 0, at least one of a, c, d, e or f is different from 0,
- when c is different from 0, at least one of a, b, d, e or f is different from 0;

and with the proviso that when said backbone comprises two moieties complying with formulae (Ia) to (If) as defined above, said two moieties are alternately arranged within the backbone.

8. The polymer (PFPE*$_{FOR}$) according to claim 7, wherein said backbone comprises a recurring unit complying with formula (PFPE$_{FOR-b}$):

$$—[CF_2R_fCF_2—OR_FO]_{y*}— \quad (PFPE_{FOR-b})$$

wherein
$R_f$ is a divalent, perfluoro linear or branched alkyl chain, wherein said alkyl chain comprises from 1 to 10 carbon atoms and is optionally interrupted by one or more oxygen atom,
$R_F$ is a divalent linear or branched perfluoro alkylene chain comprising from 2 to 10 carbon atoms and optionally interrupted by one or more oxygen atoms and
y* is an integer selected such that the average number molecular weight of the backbone of polymer (PFPE$_{FOR}$) as determined by NMR analysis is from 282 to 70-000.

9. The polymer (PFPE*$_{FOR}$) according to claim 7, wherein said recurring moieties (Ia) to (Ie) comply with formulae (Ia*) to (Ie*):

$$—CF_2CF_2O— \quad (Ia*)$$

$$—CF_2CF_2CF_2O— \quad (Ib*)$$

$$—CF_2CF_2CF_2CF_2O— \quad (Ic*)$$

$$—CF_2CF_2CF_2CF_2CF_2O—; \quad (Id*)$$

$$—CF_2CF_2CF_2CF_2CF_2CF_2O—. \quad (Ie*)$$

10. The polymer (PFPE*$_{FOR}$) according to claim 7, wherein polymer (PFPE*$_{FOR}$) is selected from polymers of formulae (PFPE*$_{FOR-1}$) to (PFPE*$_{FOR-3}$):

$$F—C(=O)—R_fCF_2—OR_FO—[CF_2R_fCF_2—OR_FO]_{y*}—CF_2R_fC(=O)F \quad (PFPE*_{FOR-1})$$

$$F—C(=O)O—R_F—O[CF_2R_fCF_2—OR_FO]_{y*}—C(=O)F \quad (PFPE*_{FOR-2})$$

$$F—C(=O)—R_f—CF_2O—R_F—O[CF_2R_FO]_{y*}—C(=O)F \quad (PFPE*_{FOR-3})$$

wherein
y* is an integer selected such that the average number molecular weight of the backbone of said polymer (PFPE*$_{FOR}$) as determined by NMR analysis is from 282 to 70-000, and each of $R_f$ and $R_F$, different from each other, complies with one of formulae (Ia*) to (Ie*):

$$—CF_2CF_2O— \quad (Ia*)$$

$$—CF_2CF_2CF_2O— \quad (Ib*)$$

$$—CF_2CF_2CF_2CF_2O— \quad (Ic*)$$

$$—CF_2CF_2CF_2CF_2CF_2O—; \quad (Id*)$$

$$—CF_2CF_2CF_2CF_2CF_2CF_2O—. \quad (Ie*)$$

11. A polymer (PFPE$_{D-EST}$) comprising a perfluoropolyether backbone having two chain ends, wherein at least one chain end comprises a group of formula —CF$_2$C(=O)OR wherein R is a linear or branched alkyl chain having from 1 to 10 carbon atoms, and wherein said backbone comprises at least one moiety selected from moieties of formulae (Ia) to (If):

$$—(C_2F_4O)_a—; \quad (Ia)$$

$$—(C_3F_6O)_b—; \quad (Ib)$$

$$—(C_4F_8O)_c—; \quad (Ic)$$

$$—(C_5F_{10}O)_d—; \quad (Id)$$

$$—(C_6F_{12}O)_e—; \quad (Ie)$$

$$—(C_xF_{2x}O)_f—; \quad (If)$$

wherein
x is an integer from 7 to 12;
each of a, b, c, d, e and f is independently 0 or an integer, wherein the sum of a, b, c, d, e and f is such that the average number molecular weight of the backbone of the polymer as determined by NMR analysis is from 282 to 70-000;
with the proviso that when said backbone comprises two moieties complying with formulae (Ia) to (If) as defined above, said two moieties are alternately arranged within the backbone.

12. A polymer (PFPE$_{D-OH}$) comprising a perfluoropolyether backbone having two chain ends, wherein at least one chain end comprises a group of formula —$CF_2CH_2OH$ and wherein said backbone comprises at least one moiety selected from moieties of formulae (Ia) to (If):

$$—(C_2F_4O)_a—;\tag{Ia}$$

$$—(C_3F_6O)_b—;\tag{Ib}$$

$$—(C_4F_8O)_c—;\tag{Ic}$$

$$—(C_5F_{10}O)_d—;\tag{Id}$$

$$—(C_6F_{12}O)_e—;\tag{Ie}$$

$$—(C_xF_{2x}O)_f—;\tag{If}$$

wherein x is an integer from 7 to 12;

each of a, b, c, d, e and f is independently 0 or an integer, wherein the sum of a, b, c, d, e and f is such that the average number molecular weight of the backbone of the polymer as determined by NMR analysis is from 282 to 70-000;

with the proviso that when said backbone comprises two moieties complying with formulae (Ia) to (If) as defined above said two moieties are alternately arranged within the backbone, and with the proviso that the backbone of polymer ($PFPE_{D\text{-}OH}$) is different from —$[(C_2F_4O)_a(C_4F_8O)_c]_{y^*}$—.

13. A polymer ($PFPE_{D\text{-}OH\text{-}X}$) comprising a perfluoropolyether backbone having two chain ends, wherein at least one chain end comprises a group of formula —$CF_2CH_2O$—$R^1$, wherein $R^1$ is a linear or branched alkyl chain comprising from 1 to 16 carbon atoms and substituted with at least 2 groups —OH and wherein said backbone comprises at least one moiety selected from moieties of formulae (Ia) to (If):

$$—(C_2F_4O)_a—;\tag{Ia}$$

$$—(C_3F_6O)_b—;\tag{Ib}$$

$$—(C_4F_8O)_c—;\tag{Ic}$$

$$—(C_5F_{10}O)_d—;\tag{Id}$$

$$—(C_6F_{12}O)_e—;\tag{Ie}$$

$$—(C_xF_{2x}O)_f—;\tag{If}$$

wherein x is an integer from 7 to 12;

each of a, b, c, d, e and f is independently 0 or an integer, wherein the sum of a, b, c, d, e and f is such that the average number molecular weight of the backbone of the polymer as determined by NMR analysis is from 282 to 70-000;

with the proviso that when said backbone comprises two moieties complying with formulae (Ia) to (If) as defined above, said two moieties are alternately arranged within the backbone.

14. The polymer ($PFPE_{D\text{-}OH\text{-}X}$) according to claim 13, wherein both said chain ends comprise a group complying with the following formulae:

—$CF_2CH_2O$—$CH_2CH(OH)CH_2OH$  ($PFPE_{D\text{-}OH\text{-}X1}$)

—$CF_2CH_2O$—$CH_2CH(OH)CH_2OCH_2CH(OH)$ $CH_2OH$  ($PFPE_{D\text{-}OH\text{-}X2}$).

15. A polymer ($PFPE_{D\text{-}OH\text{-}MD}$) complying with the following formula:

$$C_e—B\text{-}A\text{-}B—C_e$$

wherein:

each Ce is a group of formula —$CF_2CH_2O$—$R^1$, wherein $R^1$ is a linear or branched alkyl chain comprising from 1 to 16 carbon atoms and substituted with at least 2 groups —OH;

each B is a group comprising at least one moiety selected from moieties of formulae (Ia) to (If):

$$—(C_2F_4O)_a—;\tag{Ia}$$

$$—(C_3F_6O)_b—;\tag{Ib}$$

$$—(C_4F_8O)_c—;\tag{Ic}$$

$$—(C_5F_{10}O)_d—;\tag{Id}$$

$$—(C_6F_{12}O)_e—;\tag{Ie}$$

$$—(C_xF_{2x}O)_f—;\tag{If}$$

wherein x is an integer from 7 to 12;

each of a, b, c, d, e and f is independently 0 or an integer, wherein the sum of a, b, c, d, e and f is such that the average number molecular weight of the backbone of the polymer as determined by NMR analysis is from 282 to 70000;

with the proviso that when said backbone comprises two moieties complying with formulae (Ia) to (If) as defined above, said two moieties are alternately arranged within the backbone; and A is a divalent alkyl chain comprising from 3 to 20 carbon atoms, said alkyl chain being substituted with at least one —OH group and being optionally substituted with at least one fluorine atom.

16. A method for lubricating a magnetic recording media (MRM), said method comprising providing a magnetic recording media (MRM) comprising at least one magnetic layer, optionally covered by at least one carbon overcoat, and applying at least one of polymer ($PFPE_{D\text{-}OH}$), and/or eat least one polymer ($PFPE_{D\text{-}OH\text{-}X}$), and/or at least one polymer ($PFPE_{D\text{-}OH\text{-}MD}$), onto said magnetic layer or onto said carbon overcoat, wherein:

polymer ($PFPE_{D\text{-}OH}$) is a polymer comprising a perfluoropolyether backbone having two chain ends, wherein at least one chain end comprises a group of formula —$CF_2CH_2OH$ and wherein said backbone comprises at least one moiety selected from moieties of formulae (Ia) to (If):

with the proviso that the backbone of polymer ($PFPE_{D\text{-}OH}$) is different from —$[(C_2F_4O)_a(C_4F_8O)_c]_{y^*}$, polymer ($PFPE_{D\text{-}OH\text{-}X}$) is a polymer comprising a perfluoropolyether backbone having two chain ends, wherein at least one chain end comprises a group of formula —$CF_2CH_2O$—$R^1$, wherein $R^1$ is a linear or branched alkyl chain comprising from 1 to 16 carbon atoms and substituted with at least 2 groups —OH and wherein said backbone comprises at least one moiety selected from moieties of formulae (Ia) to (If);

polymer ($PFPE_{D\text{-}OH\text{-}MD}$) is a polymer complying with the following formula:

$$C_e—B\text{-}A\text{-}B—C_e$$

wherein:

each Ce is a group of formula $-CF_2CH_2O-R^1$, wherein $R^1$ is a linear or branched alkyl chain comprising from 1 to 16 carbon atoms and substituted with at least 2 groups —OH;

each B is a group comprising at least one moiety of formulae (Ia) to (If); and

A is a divalent alkyl chain comprising from 3 to 20 carbon atoms, said alkyl chain being substituted with at least one —OH group and being optionally substituted with at least one fluorine atom; and (Ia)-(If) are:

$$-(C_2F_4O)_a-; \qquad (Ia)$$

$$-(C_3F_6O)_b-; \qquad (Ib)$$

$$-(C_4F_8O)_c-; \qquad (Ic)$$

$$-(C_5F_{10}O)_d-; \qquad (Id)$$

$$-(C_6F_{12}O)_e-; \qquad (Ie)$$

$$-(C_xF_{2x}O)_f-; \qquad (If)$$

wherein x is an integer from 7 to 12;

each of a, b, c, d, e and f is independently 0 or an integer, wherein the sum of a, b, c, d, e and f is such that the average number molecular weight of the backbone of the polymer as determined by NMR analysis is from 282 to 70000;

with the proviso that when said backbone comprises two moieties complying with formulae (Ia) to (If) as defined above said two moieties are alternately arranged within the backbone.

17. Use of at least one polymer ($PFPE_{FOR}$) selected from polymers of at least one of formulae ($PFPE_{FOR-1}$) to ($PFPE_{FOR-5}$):

$$F-C(=O)-R_fCF_2-OR_FO-[CF_2R_fCF_2-OR_FO]_{y^*}-CF_2R_fC(=O)F \qquad (PFPE_{FOR-1})$$

$$F-C(=O)O-R_F-O[CF_2R_fCF_2-OR_FO]_{y^*}-C(=O)F \qquad (PFPE_{FOR-2})$$

$$F-C(=O)-R_f-CF_2O-R_F-O[CF_2R_fO]_{y^*}-C(=O)F \qquad (PFPE_{FOR-3})$$

$$T-R_f-CF_2O-R_F-O[CF_2R_fCF_2-OR_FO]_{y^*}-C(=O)F \qquad (PFPE_{FOR-4})$$

$$T-R_f-CF_2O-R_F-O[CF_2R_fCF_2-OR_FO]y^*-CF_2R_fC(=O)F \qquad (PFPE_{FOR-5})$$

wherein $R_f$ is a divalent, perfluoro linear or branched alkyl chain, wherein said alkyl chain comprises from 1 to 10 carbon atoms and is optionally interrupted by one or more oxygen atoms, $R_F$ is a divalent linear or branched perfluoro alkylene chain comprising from 2 to 10 carbon atoms and optionally interrupted by one or more oxygen atoms, T is a neutral group in the group comprising fluorine atom and linear or branched perfluoroalkyl chain comprising from 1 to 6 carbon atoms, and $y^*$ is an integer selected such that the average number molecular weight of the backbone of said polymer ($PFPE_{FOR}$) as determined by NMR analysis is from 282 to 70 000, as intermediate compound in the synthesis of at least one polymer ($PFPE_{D-EST}$), wherein polymer ($PFPE_{D-EST}$) is a polymer comprising a perfluoropolyether backbone having two chain ends, wherein at least one chain end comprises a group of formula $-CF_2C(=O)OR$ wherein R is a linear or branched alkyl chain having from 1 to 10 carbon atoms, and wherein said backbone comprises at least one moiety selected from moieties of formulae (Ia) to (If):

$$-(C_2F_4O)_a-; \qquad (Ia)$$

$$-(C_3F_6O)_b-; \qquad (Ib)$$

$$-(C_4F_8O)_c-; \qquad (Ic)$$

$$-(C_5F_{10}O)_d-; \qquad (Id)$$

$$-(C_6F_{12}O)_e-; \qquad (Ie)$$

$$-(C_xF_{2x}O)_f-; \qquad (If)$$

wherein x is an integer from 7 to 12;

each of a, b, c, d, e and f is independently 0 or an integer, wherein the sum of a, b, c, d, e and f is such that the average number molecular weight of the backbone of the polymer as determined by NMR analysis is from 282 to 70000;

with the proviso that when said backbone comprises two moieties complying with formulae (Ia) to (If) as defined above, said two moieties are alternately arranged within the backbone.

\* \* \* \* \*

UNITED STATES PATENT AND TRADEMARK OFFICE
CERTIFICATE OF CORRECTION

| | |
|---|---|
| PATENT NO. | : 10,899,883 B2 |
| APPLICATION NO. | : 16/469633 |
| DATED | : January 26, 2021 |
| INVENTOR(S) | : Marco Galimberti et al. |

Page 1 of 1

It is certified that error appears in the above-identified patent and that said Letters Patent is hereby corrected as shown below:

In the Specification
- In Column 9, Line number 10, the formula PFPEFOR-3 "F-C(=O)-Rf-CF2O-RF-O[CF2RFO]y*-C(=O)F" should read -- F-C(=O)-Rf-CF2O-RF-O[CF2RfCF2-ORFO]y*-C(=O)F --.
- In Column 10, Line number 10, the formula PFPE*FOR-3 "F-C(=O)-Rf-CF2O-RF-O[CF2RFO]y*-C(=O)F" should read -- F-C(=O)-Rf-CF2O-RF-O[CF2RfCF2-ORFO]y*-C(=O)F --.
- In Column 10, Line number 29, "(PFPE FOR)" should read -- (PFPEFOR) --.

In the Claims
- At Column 20, Claim number 4, Line number 34, the phrase "from 282 to 70-000" should read -- from 282 to 70000 --.
- At Column 20, Claim number 5, Line number 45, the formula PFPEFOR-3 "F-C(=O)-Rf-CF2O-RF-O[CF2RFO]y*-C(=O)F" should read -- F-C(=O)-Rf-CF2O-RF-O[CF2RfCF2-ORFO]y*-C(=O)F --.
- At Column 21, Claim number 7, Line number 34, the phrase "from 282 to 70-000" should read -- from 282 to 70000 --.
- At Column 21, Claim number 8, Line number 63, the phrase "from 282 to 70-000" should read -- from 282 to 70000 --.
- At Column 22, Claim number 10, Line number 19, the formula PFPE*FOR-3 "F-C(=O)-Rf-CF2O-RF-O[CF2RFO]y*-C(=O)F" should read -- F-C(=O)-Rf-CF2O-RF-O[CF2RfCF2-ORFO]y* -C(=O)F --.
- At Column 22, Claim number 10, Line number 24, the phrase "from 282 to 70-000" should read -- from 282 to 70000 --.
- At Column 22, Claim number 11, Line number 60, the phrase "from 282 to 70-000" should read -- from 282 to 70000 --.
- At Column 23, Claim number 12, Line number 21, the phrase "from 282 to 70-000" should read -- from 282 to 70000 --.
- At Column 23, Claim number 13, Line number 55, the phrase "from 282 to 70-000" should read -- from 282 to 70000 --.
- At Column 25, Claim number 17, Line number 43, the formula PFPEFOR-3 "F-C(=O)-Rf-CF2O-RF-O[CF2RFO]y*-C(=O)F" should read -- F-C(=O)-Rf-CF2O-RF-O[CF2RfCF2-ORFO]y*-C(=O)F --.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*